United States Patent [19]

Bosses

[11] Patent Number: 5,306,534
[45] Date of Patent: Apr. 26, 1994

[54] VACUUM CLEANER BAG WITH ELECTROSTATICALLY CHARGED MELTBLOWN LAYER

[75] Inventor: Mark D. Bosses, Montvale, N.J.

[73] Assignee: Home Care Industries, Inc., Clifton, N.J.

[21] Appl. No.: 907,162

[22] Filed: Jul. 1, 1992

Related U.S. Application Data

[63] Continuation-in-part of Ser. No. 673,514, Mar. 22, 1991, abandoned, and a continuation-in-part of Ser. No. 704,873, May 23, 1991, abandoned.

[51] Int. Cl.$^5$ ............ B65D 30/04; B01D 46/00
[52] U.S. Cl. ............ 428/35.2; 428/36.1; 428/246; 428/248; 428/252; 428/284; 428/287; 428/903; 383/117; 15/347; 55/382
[58] Field of Search ............ 428/35.2, 36.1, 36.2, 428/246, 248, 252, 284, 287, 903; 383/117; 15/347; 55/382

[56] References Cited

U.S. PATENT DOCUMENTS

| | | | |
|---|---|---|---|
| 2,813,596 | 11/1957 | Voigtman et al. | 55/382 |
| 3,498,031 | 3/1970 | Fesco | 55/368 |
| 3,535,855 | 10/1970 | Howard et al. | 55/368 |
| 4,069,026 | 1/1978 | Simm et al. | 95/63 |
| 4,116,648 | 9/1978 | Busch | 55/276 |
| 4,164,400 | 8/1979 | Wald | 55/382 |
| 4,215,682 | 8/1980 | Kubik et al. | 128/205.29 |
| 4,257,791 | 3/1981 | Wald | 55/382 |
| 4,277,791 | 7/1981 | Rosenstock et al. | 364/140 R |
| 4,350,727 | 9/1982 | Wald et al. | 428/102 |
| 4,374,888 | 2/1983 | Bornslaeger | 428/284 |
| 4,397,907 | 8/1983 | Rosser et al. | 428/240 |
| 4,522,876 | 6/1985 | Hiers | 428/285 |
| 4,536,440 | 8/1985 | Berg | 428/284 |
| 4,540,625 | 9/1985 | Sherwood | 428/283 |
| 4,589,894 | 5/1986 | Gin et al. | 55/274 |
| 4,713,068 | 12/1987 | Wang | 428/903 |
| 4,749,348 | 6/1988 | Klaase | 425/174.8 E |
| 4,789,504 | 12/1988 | Ohmori et al. | 264/22 |
| 4,824,451 | 4/1989 | Vogt et al. | 55/528 |
| 4,917,942 | 4/1990 | Winters | 96/99 |
| 4,948,639 | 8/1990 | Brooker | 428/36.1 |
| 5,051,159 | 9/1991 | Togashi et al. | 204/165 |
| 5,080,702 | 1/1992 | Bosses | 55/382 |

FOREIGN PATENT DOCUMENTS

89106843  10/1989  European Pat. Off. .

OTHER PUBLICATIONS

Brochure, "Model 8110 Automated Filter Tester", Manufactured by TSI, Inc., Industrial Test Instruments Group, Copyright 1990.
McGraw-Hill Dictionary of Scientific & Technical Terms, Parker, S. Ed., 3d Ed., 1984, p. 160.
ASTM Test Standard ASTM D 3884-80, "Standard Test Method for Abrasion Resistance of Textile Fabrics . . .", May, 1980.
Margrat, "The Evolution of Corona Treating Electrodes" (Enercon Industries Corp.).

*Primary Examiner*—Ellis P. Robinson
*Assistant Examiner*—Rena L. Dye
*Attorney, Agent, or Firm*—Amster, Rothstein & Ebenstein

[57] ABSTRACT

This invention relates to a vacuum cleaner filter having an outer textile fabric material laminated to a non-woven composite material. The composite material comprises an inner and an outer cover layer of a spun-bonded, non-woven web material, with at least one electrostatically charged intermediate meltblown layer sandwiched therebetween.

17 Claims, 1 Drawing Sheet

VACUUM CLEANER BAG WITH ELECTROSTATICALLY CHARGED MELTBLOWN LAYER

CROSS REFERENCE TO RELATED APPLICATIONS

This Application is a Continuation-In-Part of U.S. patent application Ser. No. 07/673,514 filed on Mar. 22, 1991, now abandoned entitled VACUUM CLEANER BAG, and a Continuation-In-Part of U.S. patent application Ser. No. 07/704,873 filed on May 23, 1991, now abandoned entitled VACUUM CLEANER BAG HAVING CORONA TREATED MELTBLOWN FILTER.

FIELD OF THE INVENTION

This invention relates to a reusable vacuum cleaner comprising an outer textile fabric material which is laminated to a non-woven composite material. The composite material comprises an inner layer and an outer layer of spun-bonded, non-woven web with at least one meltblown layer sandwiched therebetween, wherein said at least one meltblown layer is electrostatically charged.

BACKGROUND OF THE INVENTION

A variety of vacuum cleaner filters utilizing non-woven components are known. For example, U.S. Pat. No. 2,813,596 discloses a disposable vacuum cleaner dust container that has a strong, porous wrapper of sheet material able to filter dust particles from an air stream and a liner that includes plies of creped, cellulosic wadding.

U.S. Pat. No. 3,498,031 relates to a vacuum cleaner bag containing a reinforcing and auxiliary filter insert of felt-like material, and U.S. Pat. No. 4,540,625 is concerned with a flexible composite useful in fabricating filters and having a fiber mass of a randomly oriented mixture of non-woven substrate fibers and organic polymer fibers intertwined therewith and containing solid sorptive microscopic particles disposed against the non-woven fibers to form a flexible, air permeable, absorbent fiber filter. Other examples of filters using non-woven components will be found in U.S. Pat. Nos. 3,535,855 and 4,257,791, which is a division of U.S. Pat. Nos. 4,164,400, 4,397,907 and 4,522,876.

U.S. Pat. No. 4,589,894 describes a disposable filter for a vacuum cleaner having a microfiber filter layer sandwiched between first and second outer support layers of highly porous fabric formed of synthetic fibers.

U.S. Pat. No. 4,350,727 describes a textile composite having a knitted fabric material bonded to a non-woven needled fabric material.

Corona treated meltblown materials are known in the art, particularly in the manufacture of surgical face masks. A typical corona treating system is essentially comprised of a high voltage electrode separated by an air gap from a dielectrically covered ground electrode. A meltblown web is corona treated by exposing it to a corona created by a voltage buildup which ionizes the air in the air gap through which the meltblown web is passed. In "The Evolution Of Corona Treating Electrodes" by D. Markgraf (Enercon Industries Corp.), numerous methods of corona treatment that are known in the art, such as those employing wire electrodes, threaded rod electrodes, bar electrodes, segmented metal electrodes, driven electrode rolls, quartz electrodes and ceramic electrodes are disclosed.

Although corona treated meltblown webs are known, they have not ever been employed in a vacuum cleaner bag in the manner described in the present invention.

SUMMARY OF THE INVENTION

The present invention features a reusable vacuum cleaner bag which has superior filtering and air permeability characteristics.

The sheet material from which the vacuum cleaner bag of the instant invention is fabricated comprises an outer layer of a textile fabric material laminated to a composite of non-woven materials, wherein the composite comprises an inner cover layer of a spun-bonded, non-woven web material, at least one electrostatically charged intermediate layer of meltblown material, and an outer layer of a spun-bonded non-woven web material. The meltblown layer may be electrostatically charged by using corona treatment.

DETAILED DESCRIPTION OF THE INVENTION

Figure 1:
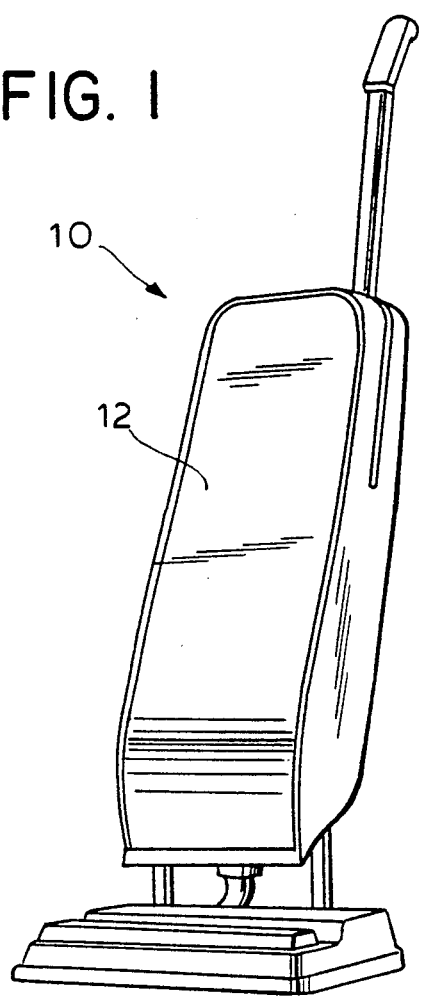
FIG. 1 depicts an upright vacuum cleaner having a reusable filter bag made in accordance with the instant invention.

Although cloth filter bags can be used in various kinds of vacuum cleaners, they are most commonly found on upright cleaners. One such cleaner 10 is depicted in FIG. 1, with the filter bag according to the instant invention being identified by the numeral 12.

Cloth filter bags are generally reusable and can be used alone or in conjunction with disposable bags. When used with a disposable bag, a cloth bag in accordance with the instant invention prevents most of the fine particles which have passed through the disposable bag from passing into the surrounding environment. When used without a disposable bag, a cloth bag in accordance with the instant invention remove not only the fine particles, but the coarser ones as well.

Figure 2:
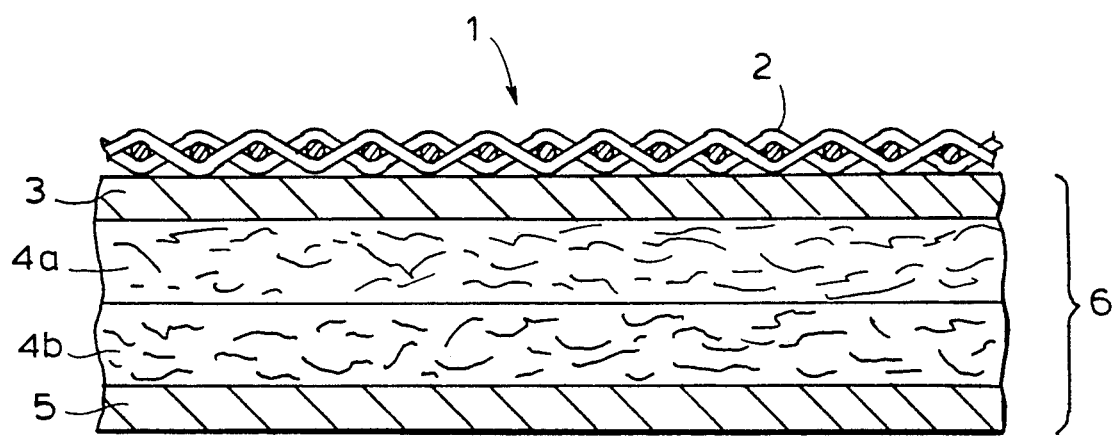
FIG. 2 is an illustration of a cross-section of the multi-layered sheet material from which the vacuum cleaner bag of the present invention is fabricated.

Referring to FIG. 2, a reusable vacuum cleaner bag according to the instant invention may be fabricated from sheet material 1 comprised of a textile fabric 2 to which there has been laminated a sandwich or composite sheet 6 of non-woven materials. The textile fabric may be made of natural fibers, including wool and cotton, or of synthetic fibers, including polyester, nylon, rayon, polyvinylchloride and acrylics, or of some blend of natural and synthetic materials.

The textile fabric can be produced by any of the conventional knitting or weaving techniques, and may have a basis weight of between about 0.7 oz./yd.$^2$ to 25 ozs./yd.$^2$, preferably between 0.7 oz./yd.$^2$ to 7 ozs./yd.$^2$, and more preferably between about 2 ozs./yd.$^2$ and 6 ozs./yd.$^2$.

The sandwich or composite material 6 comprises an inner cover layer 3 and an outer cover layer 5 of spun-bonded, non-woven web material, preferably synthetic, and at least one electrostatically charged intermediate meltblown layer 4a and 4b. It is believed that the most cost effective composite material 6 having the optimum performance characteristics for use in practicing the instant invention has a basis weight of between about 5 ozs./yd.$^2$ and about 5.5 ozs./yd.$^2$, preferably about 5.2 ozs./yd.$^2$; a grab textile strength in both the machine direction and cross direction of at least 60 lbs., preferably 80 lbs.; a trap tear strength in both the machine direction and cross direction of at least 10 lbs., preferably 20 lbs.; and a Frazier porosity or permeability of at least about 8 cfm, preferably about 17 cfm, measured at 0.5 inches H$_2$O pressure drop.

Generally, the spun-bonded layers 3 and 5 have a basis weight of from about 1 to about 3 ozs./yd.$^2$ each, preferably about 2 ozs./yd.$^2$ each. The electrostatically charged meltblown layers 4a and 4b generally have a basis weight of from about 0.25 to about 2 ozs./yd.$^2$ each, preferably about 0.6 oz./yd.$^2$ each. In this regard, it is not required that there be two layers of electrostatically charged meltblown materials. Rather, it is also acceptable if one layer of electrostatically charged meltblown material is used, in which case the basis weight should range from about 0.5 oz./yd.$^2$ to about 4 ozs./yd.$^2$, with the preferred basis weight being about 1.2 ozs./yd.$^2$. Similarly, the electrostatically charged meltblown component may be made of three or more layers.

The spun-bonded layers protect the electrostatically charged meltblown material and lend support thereto. In addition, the spun-bond layers serve as filter a with respect to larger particles. The inner spun-bonded cover layer 3 is also the substrate by which lamination to the textile fabric layer 1 is accomplished. The composite material 6 is preferably adhered to the outer knitted textile fabric 2 using a charne adhesive. The charne is a knit scrim adhesive which melts or fuses under heat and pressure. Alternatively, cold glues may be utilized or a hot melt adhesive may be randomly sprayed. In the preferred embodiment, it is interposed at the interface between the outer knitted textile fabric and the composite material, and, upon the application of heat and pressure, the textile and non-woven components are laminated together to make the filter sheet material 1 useful in practicing the present invention.

The spun-bonded and meltblown layers can be formed from a variety of materials, preferably, synthetic thermoplastics, including, for example, polypropylene and polyethylene terephthalene, polyethylene, polyamides, polyester, nylon, and other polymers known in the art. The preferred thermoplastic material for forming the layers is polypropylene. To facilitate bonding of the component layers of the composite material, it is believed preferable that the same polymer, e.g., polypropylene, be employed in each of the component layers. This, however, is not absolutely necessary.

The component layers of the composite material according to the present invention may be pattern bonded together Such pattern bonding process is known in the art and is described in U.S. Pat. No. 4,374,888.

Additional component layers may be added without departing from the spirit of the instant invention. For example, an additional textile inner sheet could be laminated to spun-bonded inner layer 3 of composite sandwich sheet 6.

The method of electrostatically charging the meltblown layer may comprise any acceptable method, including corona treatment. A corona is created by a voltage buildup between two electrodes which causes the ionization of the air between them. The meltblown layer is corona treated by being passed through this air gap. The instant invention envisions the use of a nonwoven, microfiber web that has been subject to any type or method of treatment to render same electrostatically charged.

It is believed that electrostatic charging, such as by corona treatment, increases the surface tension of the meltblown web and also causes a mechanical change in the structure of the fibers. This mechanical change may reduce the fragility of the web while, at the same time, creating a more tortuous path through the fibers, thereby enhancing the filtration characteristics of the web. In addition, it is believed that the filtration characteristics of the electrostatically charged meltblown web are further enhanced by corona treatment.

Meltblown layers for use in practicing the subject invention may be webs formed of randomly intertangled synthetic polymeric microfibers primarily of about 10 microns or less in diameter. Since it is believed that corona treatment has the greatest effect on fibers at the lower end of this range, it is preferred that the meltblown layer have a higher percentage of microfibers of less than about 1 micron in diameter than might be found in meltblown layers not destined for corona treatment. Most desirably, about 15% of the fibers should be in the submicron (i.e., less than 1 micron) range. It should be understood, however, that more conventional meltblown layers (i.e., those whose fiber distribution is less skewed toward the submicron range) can also be corona treated and used to practice the instant invention.

While the present invention has been described with respect to what is presently considered to be the preferred embodiment, it is to be understood that the invention is not limited to the specifics of the embodiment described herein. The present invention is intended to cover various and equivalent arrangements included within the spirit and scope of the appended claims.

What is claimed is:

1. A reusable vacuum cleaner bag fabricated from a multi component sheet, said sheet comprising:
   an outermost layer of a textile fabric material, said outer layer being laminated to a non-woven composite material, said composite material comprising:
   an inner cover layer of a spun-bonded, non-woven web;
   at least one electrostatically charged intermediate meltblown layer; and
   an outer cover layer of a spun-bonded, non-woven web.

2. The reusable vacuum cleaner bag of claim 1 wherein said composite material contains two electrostatically charged intermediate meltblown layers.

3. The reusable vacuum cleaner bag of claim 1 wherein said textile fabric is comprised primarily of polyester fibers.

4. The reusable vacuum cleaner bag of claim 1 wherein said textile fabric material has a basis weight of between about 0.7 oz./yd.$^2$ and about 7 ozs./yd.$^2$.

5. The reusable vacuum cleaner bag of claim 4 wherein said textile fabric has a basis weight of between about 2 ozs /yd.$^2$ and about 6 ozs /yd.$^2$.

6. The reusable vacuum cleaner bag of claim 1 wherein said composite material has a basis weight of between about 5 ozs./yd.$^2$ and about 5.5 ozs./yd.$^2$.

7. The reusable vacuum cleaner bag of claim 1 wherein said spun-bonded layers and said at least one electrostatically charged meltblown layer are formed from a synthetic thermoplastic material.

8. The reusable vacuum cleaner bag of claim 7 wherein said thermoplastic material is polypropylene.

9. The reusable vacuum cleaner bag of claim 1 wherein said at least one electrostatically charged intermediate meltblown layer has a basis weight of between about 0.5 oz./yd.$^2$ and about 4 ozs./yd.$^2$.

10. The reusable vacuum cleaner bag of claim 2 wherein said two electrostatically charged meltblown layers each have a basis weight of between about 0.25 oz./yd.$^2$ and about 2 ozs./yd.$^2$.

11. The reusable vacuum cleaner bag of claim 1 wherein said at least one electrostatically charged meltblown layer is comprised of polypropylene.

12. The reusable vacuum cleaner bag of claim 1 wherein said inner cover layer is comprised of polypropylene.

13. The reusable vacuum cleaner bag of claim 1 wherein said outer cover layer is comprised of polypropylene.

14. The reusable vacuum cleaner bag of claim 11 wherein at least one of said inner cover layer and said outer cover layer is comprised of polypropylene.

15. The reusable vacuum cleaner bag of claim 1 wherein said inner cover layer, said outer cover layer and said at least one electrostatically charged intermediate meltblown layer are comprised of the same material.

16. The reusable vacuum cleaner bag of claim 1 further comprising an inner textile fabric component.

17. The reusable vacuum cleaner bag of claim 1 wherein said intermediate meltblown layer is electrostatically charged by corona treatment.

* * * * *